UNITED STATES PATENT OFFICE.

VICTOR C. G. NELSON, OF CHICAGO, ILLINOIS.

COMPOUND FOR TREATING PLASTIC OBJECTS.

1,051,907. Specification of Letters Patent. Patented Feb. 4, 1913.

No Drawing. Application filed January 22, 1912. Serial No. 672,691.

*To all whom it may concern:*

Be it known that I, VICTOR C. G. NELSON, a subject of the King of Sweden, and having legally declared my intention of becoming a citizen of the United States, residing at Chicago, in the county of Cook and State of Illinois, have invented a certain new and useful Compound for Treating Plastic Objects, of which the following is a specification.

My invention relates to compounds for treating plastic objects, and the purpose of the invention is to nullify the effects of the efflorescence frequently appearing upon the surface of bricks, plaster or concrete, and commonly referred to as "saltpeter." It is well known that in plastic objects such as the ones mentioned, "saltpeter" frequently appears upon the surface, not only spoiling the appearance but actually causing deterioration of the object itself and loosening the paint or calcimine or other coating which may have been applied. The presence of this efflorescence in so-called "common" brick is almost universal and works great damage and annoyance, and the purpose of my compound is to render the brick and the coatings thereof free from the damaging effects of this substance.

My compound consists of the following material and is produced by the following method: To produce a hundred gallons of my compound I take one-hundred and sixty pounds of sodium benzoate and three-hundred and twenty pounds of sodium carbonate and heat them in a vessel until they melt and form a liquid which, for convenience, I will refer to as "saltyr." This saltyr may be cooled off to ordinary atmospheric temperature without losing its liquid form and the amounts mentioned produce substantially fifty gallons of liquid. To this saltyr, which forms the active agent of my compound, I add what may be considered a carrying liquor. This carrying liquor consists preferably of fifty pounds of dry ground color or "mineral" paint and seventy pounds of some saccharine material added to fifty gallons or thereabout of water. The saccharine material most desirable is brown sugar, and the liquor consisting of the ground color, saccharine material and water is boiled for five minutes or thereabout for the purpose of obtaining complete solution. After the saltyr and carrying liquor are thus obtained I mix them together and bring them to a boil for about one minute. An excessive boiling period must be avoided as it will change the character of the ingredients and produce a tendency to harden and otherwise lessen the desirable properties of the compound.

The compound resulting from the above process is a liquid, the color of which will depend upon the color of the ground paint used in its production. It has a salty, somewhat bitter taste, and after standing a sediment will form. It is, therefore, necessary before using that the compound should be well stirred or shaken.

The compound is used by painting it with a brush or otherwise applying it to the surface of the brick or other object to be treated. A period of twenty-four hours or somewhat longer in some cases is sufficient for the compound to take effect. At the end of this period an examination will show that some of the saltpeter has been drawn to the surface of the brick, although not necessarily all of it. The amount thus drawn to the surface will depend somewhat upon the condition of the efflorescence in the brick and somewhat upon the condition of the brick itself. It will be found, however, that both that which is drawn to the surface and that which remains within the brick will be neutralized and rendered powerless to harm paint, calcimine or other coating. That which is brought to the surface is in powdered form and may be readily dusted or blown off. That which does not come readily may without danger be left, for it adheres to the brick, and furthermore, is neutralized or deadened so as to have no effect upon the superposed coating whatever it may be.

Where the object to be treated is of unusual hardness such as occurs in fire brick or hard plaster the penetration of the compound will be facilitated by previously dampening the surface of the object.

It will be understood that the presence of the ground paint is not essential. Its purpose is to give body to the compound and facilitate the spreading thereof upon the surface to be treated. It will be understood furthermore that the function of the sugar or other saccharine ingredient is to assist in giving body to the compound but more especially to render it flexible or elastic and to assist it to adhere to the surface of the object while the saltyr or active agents of the compound are entering into the object.

Having thus described my invention, what I claim as new, and desire to secure by Letters Patent, is:

A compound for preventing efflorescence on bricks, comprising sodium carbonate and a salt formed by a benzoate radical, together with a saccharine ingredient all dissolved in water.

In witness whereof, I have hereunto subscribed my name in the presence of two witnesses.

VICTOR C. G. NELSON.

Witnesses:
HOWARD M. COX,
MARGARET D. ROBB.